(12) United States Patent
Oesterheld et al.

(10) Patent No.: US 10,020,764 B2
(45) Date of Patent: Jul. 10, 2018

(54) SYSTEM FOR COMPENSATING ROTOR VIBRATIONS

(71) Applicant: ALSTOM Technology Ltd, Baden (CH)

(72) Inventors: Joerg Oesterheld, Meisterschwanden (CH); Luca Alberti, Niederrohrdorf (CH); Giovanni Cataldi, Zurich (CH)

(73) Assignee: GENERAL ELECTRIC TECHNOLOGY GMBH, Baden (CH)

(*) Notice: Subject to any disclaimer, the term of this patent is extended or adjusted under 35 U.S.C. 154(b) by 295 days.

(21) Appl. No.: 14/868,546

(22) Filed: Sep. 29, 2015

(65) Prior Publication Data

US 2016/0094172 A1     Mar. 31, 2016

(30) Foreign Application Priority Data

Sep. 30, 2014   (EP) .................................... 14187191

(51) Int. Cl.
| | |
|---|---|
| *F16F 15/10* | (2006.01) |
| *H02P 9/26* | (2006.01) |
| *F16F 15/00* | (2006.01) |
| *G01H 1/10* | (2006.01) |

(52) U.S. Cl.
CPC ................ *H02P 9/26* (2013.01); *F16F 15/00* (2013.01); *F16F 15/10* (2013.01); *G01H 1/10* (2013.01)

(58) Field of Classification Search
CPC .......... F16F 7/1005; F16F 15/00; F16F 15/10; G01H 1/006; G01H 1/10; H02P 4/00; H02P 9/26
See application file for complete search history.

(56) References Cited

U.S. PATENT DOCUMENTS

| | | | | |
|---|---|---|---|---|
| 4,887,468 A | * | 12/1989 | McKendree | ........... G01H 1/006 73/660 |
| 8,465,374 B2 | | 6/2013 | Maier | |
| 2002/0194932 A1 | * | 12/2002 | Gysling | ................... G01N 3/00 73/850 |
| 2005/0114989 A1 | * | 6/2005 | Harward | .............. A41D 27/245 2/275 |
| 2013/0249213 A1 | * | 9/2013 | Oesterheld | ................ H02P 9/08 290/31 |
| 2014/0102398 A1 | | 4/2014 | Orlamünder | |
| 2014/0109720 A1 | | 4/2014 | Werner | |

* cited by examiner

*Primary Examiner* — Stephen W Smoot
(74) *Attorney, Agent, or Firm* — GE Global Patent Operation; Rita D. Vacca (57) ABSTRACT

The present disclosure relates to a system to compensate for mechanical forces on a rotating rotor of an electric machine, to a method for compensating mechanical forces on a rotating rotor of an electric machine, and to a use of a corresponding system. Disclosed is a system for compensating torsions at a rotating rotor. The system includes at least one measuring device for measuring specific properties of the rotor, an analyzer unit for analyzing the measurement data of the measuring device, a compensation means for compensating the torsions at the rotor, the compensation means comprise a power supply unit generating a signal adapted in amplitude and frequency to the measured properties of the rotor, and to apply the generated signal to the rotor, and the power supply unit is a frequency converter.

11 Claims, 6 Drawing Sheets

SYSTEM FOR COMPENSATING ROTOR VIBRATIONS

CROSS-REFERENCE TO RELATED APPLICATIONS

This application claims priority to European Patent Convention Application No. 14187191.3 filed Sep. 30, 2014, the contents of which are hereby incorporated in its entirety.

TECHNICAL FIELD

The present disclosure relates to a system to compensate for mechanical forces on a rotating rotor of an electric machine, to a method for compensating mechanical forces on a rotating rotor of an electric machine, and to a use of a corresponding system.

The electric machine is in particular a rotating electric machine such as a synchronous generator to be connected to a gas or steam turbine (turbogenerator) or a synchronous generator to be connected to a hydro turbine (hydro generator) or an asynchronous generator or a synchronous or asynchronous electric motor or also other types of electric machines.

BACKGROUND

The shafts of land-based gas turbines and other land-based turbomachinery equipment are typically monitored by means of absolute vibration sensors that measure the absolute movement of the bearing external elements or by means of relative vibration sensors that measure the movement of the rotor of an assigned generator with respect to the bearing external elements. The values measured by the sensors, typically displacement, velocity, or acceleration vibration amplitude, are monitored with respect to maximum limit values. These limit values are defined taking into account the shaft mechanical integrity and clearances between rotor and casing elements. In some cases the measured signals are further analysed in the frequency domain and then compared to other appropriate limit values. In case the vibrations are too strong, the operation of the equipment is immediately interrupted by a protection system which sends the corresponding commands. The commands can comprise for example the closure of the fuel trip shut-valve in the case of a gas turbine, or the opening of a circuit breaker in electrical drive applications. Such state of the art monitoring and protection systems are very reliable for the detection of rotor bending vibrations, whereas they are not capable of performing a direct detection of rotor torsional vibrations.

The patent application US 2014109720 A1 however describes an engine subject to torsional vibrations comprising a torsional vibration damper generating a compensation torque by means of inertial masses via springs.

The U.S. Pat. No. 846,537 B2 describes a damping system for eliminating torsion vibrations of a shaft of a machine with a torque sensor and a magnetostrictive actuator device for generating a mechanical counter-vibration.

SUMMARY

It is an object of the invention to provide a method and a device for measuring the torsional vibrations of a rotor of an electric machine by alternative means.

This object is achieved by a system, a method, and a use of the system according to the independent claims.

Further examples of the invention are disclosed in the dependent claims.

BRIEF DESCRIPTION

Further characteristics and advantages will be more apparent from the description of a preferred but non-exclusive embodiment of the system and a method for compensating mechanical forces, illustrated by way of non-limiting example in the accompanying drawings, in which.

DETAILED DESCRIPTION

With reference to the figures, these show different views, wherein like reference numerals designate identical or corresponding parts throughout the several views.

Figure 1:
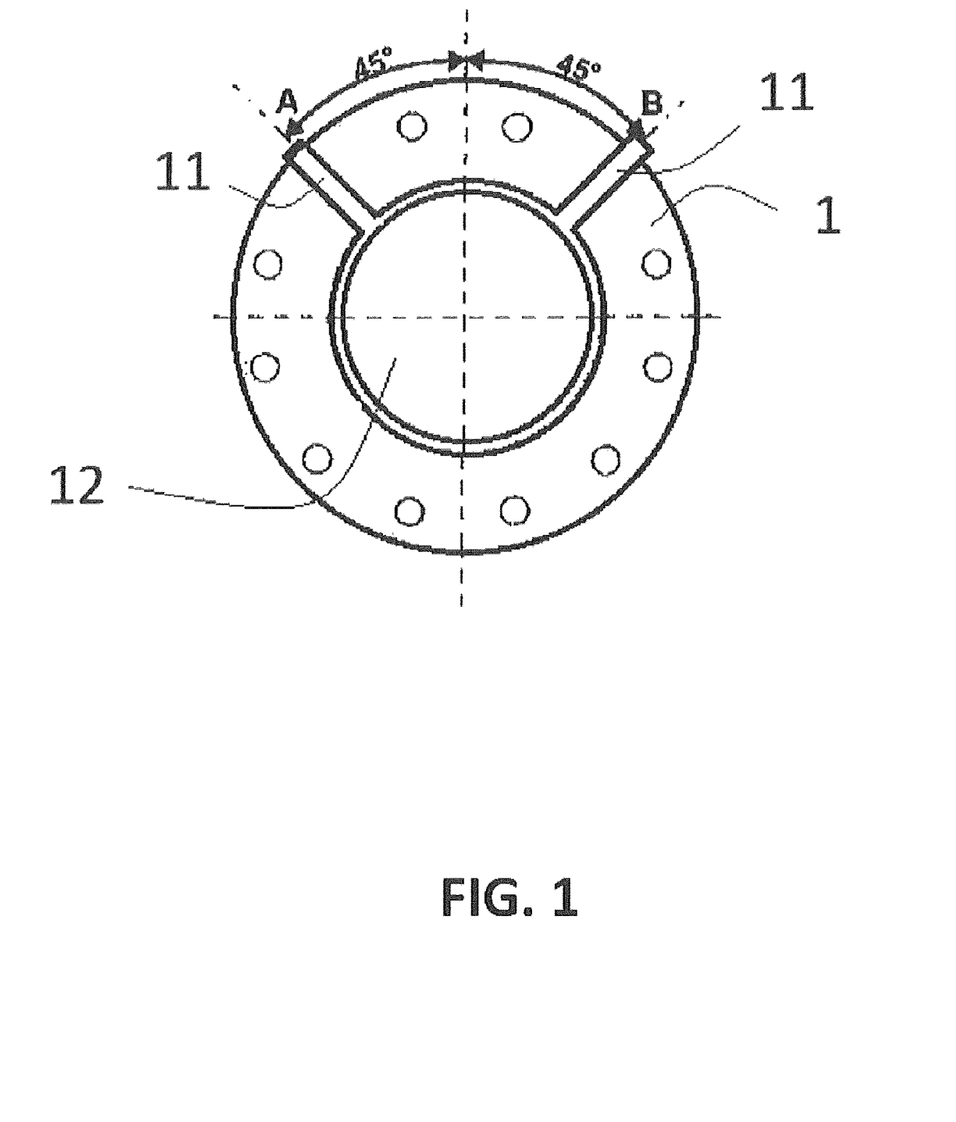
FIG. 1 is a schematic cross-section of a front view of a rotor with a rotor shaft and designed cavities in the rotor to introduce sensors for measuring the movement of the rotor.

FIG. 1 shows a schematic cross-section of a front view of a rotor 1 with a rotor shaft 12 encompassed by the rotor 1 according to the state of the art. The rotor 1 can be part of a turbo machine, i.e. a turbine or a compressor, or part of an electrical machine, e.g. a generator. On the upper left and right side of the rotor 1 a straight cavity 11 is designed projecting radially through the whole width of the housing of the rotor 1 from the inside to the outside. The cavities 11 are shaped such that these are suited for introduction of a sensor device, to measure the absolute bearing vibrations and shaft relative vibrations of the rotor 1. The cavities 11 have a distance from 90° of the angle of the rotor 1 from each other.

Figure 2:
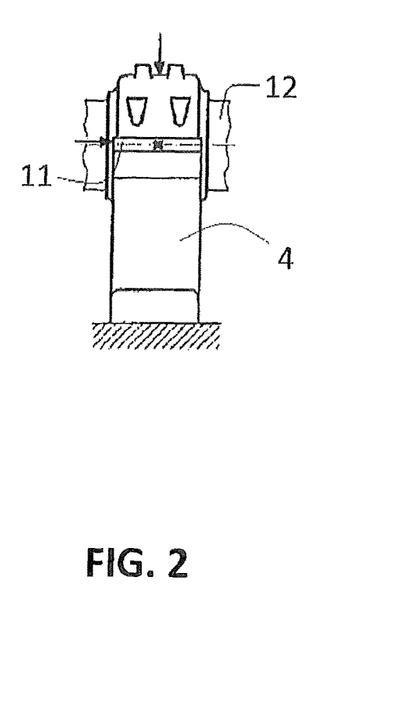
FIG. 2 is a schematic side view of a bearing support of a generator with a rotor with designed cavities.

FIG. 2 shows a schematic side view of a bearing support 4 for a shaft 12 of a rotor 1 with designed cavities 11 according to the state of the art. At the bottom the bearing support 4 is shown standing on the ground and supporting the shaft 12 of the rotor 1. The sensor cavity 11 is manufactured in the housing of the rotor 1 to accommodate the sensor device and is shown in a schematic way. The two arrows in FIG. 2 at the top and at the left illustrate the positions in which the sensors are to be placed.

Figure 3:
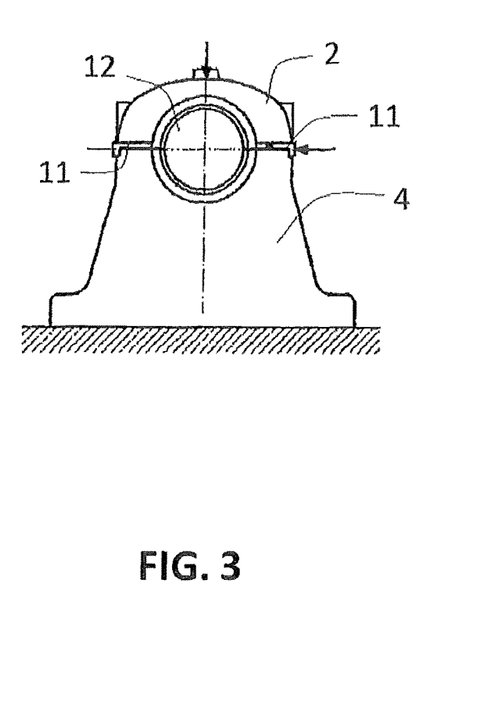
FIG. 3 is a schematic front view of a bearing support of a generator similar to FIG. 2.

FIG. 3 shows a schematic front view of a generator similar to FIG. 2. Illustrated is the massive bearing support 4 with a circular opening in which the shaft 12 is seated with a specific distance gap to the inside of the opening. At the left and right side a horizontal and longitudinal cavity 11 is manufactured in the bearing support 4. The cavity 11 is suitable to accommodate a sensor device 5 which is inserted into the cavity 11, indicated by the arrow at the right. The solutions according to the state of the art of the FIGS. 1-3 are suitable to measure axial, vertical, and lateral vibrations at the shaft 12 of the rotor 1.

Figure 4:
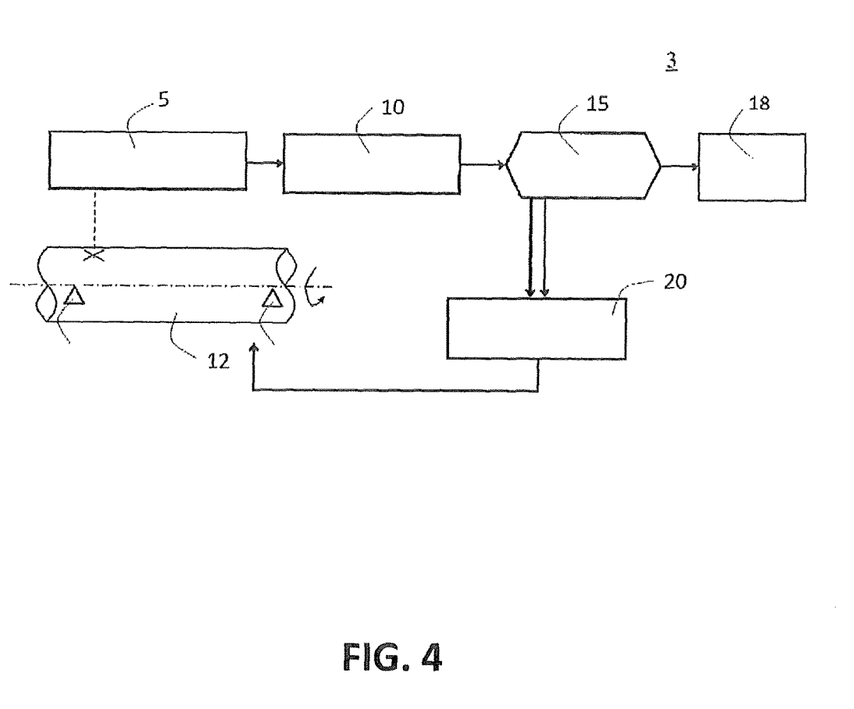
FIG. 4 is a block diagram illustrating an example of the system with a rotating rotor, a measuring device measuring torsions of the rotor, an analysing unit analysing the measurement results, a computer unit to compute the compensation to be generated to add to the rotor by a compensation means, and a memory unit to store operation events and estimate the remaining lifetime of the rotor.

FIG. 4 shows a block diagram illustrating an example of the system 3 comprising several units. First, a rotating rotor 1 of a generator is provided, shown here as a side view of a part of the cylindrical shaft 12 of the rotor 1 in a vertical position. The rotor 1 is rotating, which means in operation mode when measuring according to the invention. In FIG. 4 the measuring device 5 is illustrated as block diagram with a dashed line connected to the rotor 1. This means that measuring data is collected from the rotating rotor 1 by the measuring device 5. The measuring data is for example the torsional deformation, vibrations of the shaft 12 of the rotor 1, stresses at the shaft 12 of the rotor 1, all during operation in real time. The measuring device 5 can comprise a high resolution speed transducer which measures the speed fluctuations at the rotor 1 of the generator. The high resolution speed transducer is installed at the non-driven end of the generator in an example. The measuring device 5 can further comprise at least one Ferraris sensor which preferably measures the relative acceleration of the rotor 1. From the measuring device 5 the data is transmitted to an analyser unit 10 in which the data is analysed in the time domain or in the frequency domain, or in both domains. Depending on the application the analyser unit 10 executes the averaging and filtering of the data. The analyser unit 10 is designed to calculate further useful variables from the data, for example torsional stresses or the velocity of deformation of the rotor 1. Next, the data from the analyser unit 10 is transmitted to a computer unit 15. In the computer unit 15 the data is compared to stored data. The stored data are essentially pre-defined limit values, for example maximum acceptable torsional deformations or maximum acceptable stresses of the rotor 1. In the case that one or more of the limit values stored in the computer unit 15 are exceeded the computer unit 15 initiates protective or control actions in order to bring the rotor 1 back to a safe state with variables in an appropriate range. To this end the computer unit 15 is connected to compensation means 20 to transmit control data to the compensation means 20 if necessary. The protective or control actions created by the computer unit 15 can comprise for example the interruption of the rotation of the rotor 1, the disconnection of the rotor 1 from other systems causing the torsional vibrations, or other actions relevant regarding the safety and rotor integrity. Alternatively to the system 3 described under FIG. 4 the functions of the measuring device 5, the analyser unit 10, and the computer unit 15 can be integrated in one unit or in a number of different units assigned to different rotors 1 in a network of connected generators exchanging data with each other. The compensation means 20 can comprise a power supply unit for supplying an electrical power to the shaft 12 of the rotor 1. In a different example of the invention the compensation means 20 can comprise a mass damper for supplying a mechanical force to the shaft 12 of the rotor 1. The mass damper is adapted to compensate torsions at the shaft 12 by mechanical counterforces. In the following the compensation by a power supply unit is described further. Receiving the data from the computer unit 15, the compensation means 20 creates a power to be fed to the rotor control. This power signal is phase shifted to the power signals received by the measuring device 5, analysed and calculated in the analyser unit 10 and the computer unit 15. The frequency of the created signal is identical to the frequency of the measured data. Applying this power signal generated by the compensation means 20 to the control of the rotor 1, the rotor 1 is excited. The effect of this excitation is that the vibrations of the rotor 1 are counteracted. With other words a kind of damping is introduced to the rotation of the rotor 1. The phase shifted power signal from the compensation means 20 provides for the disturbances in the rotation of the rotor 1 to be reduced. The system 3 can be applied to a shaft train comprising several rotors 1 which are installed along a single axis or which are installed along several axes. The rotors 1 are connected to each other via one or more gearboxes. In an example of the invention the system 3 comprises a memory unit 18 which is fed by data from the analyzer unit 10. The memory unit 18 counts and stores all events received from the analyser unit 10, especially all events characterized by remarkably high torsional stresses at the rotor 1, and the memory unit 18 records parameters representative of said events. These parameters are the duration of the event, the maximum stresses reached during the event for example. The memory unit 18 has one main function to estimate the remaining lifetime of the monitored rotor 1 or rotors or the elements connected to the rotor 1 on basis of events of high torsional stresses. The memory unit 18 further counts the number and the intensity of possible fault synchronization events between the generator included in the monitored power plant and electrical grid to which it supplies energy. The data of the memory unit 18 can be read-out from the memory unit 18 or transmitted to the service operator. The memory unit 18 can also be integrated or combined with the analyser unit 10 and/or the computer unit 15. The memory unit 18 can further exchange information with another coordination system of the power plant, which coordination system is preferably part of a commonly provided control or protection system of the unit to be protected.

The sensor is designed as a contactless torque sensor in one example. With this contactless torque sensor especially rotor deformations are measured from a distance larger than 0.5 mm from the shaft surface of the rotor 1. The measuring device 5 comprises in one example at least one strain gauge 7 mounted on the rotor 1. The strain gauge 7 is especially suitable for measuring the deformation of the rotor 1 during operation. The strain gauge 7 can be connected to the measuring device 5 by means of a telemetry system comprising a telemetry ring 13 or via measuring slip rings. In an example, at least three strain gauges 7 are mounted to the rotor 1 in each measurement plain. Further, each strain gauge 7 can consist of at least two sensing elements.

The sensor device can comprise at least one high resolution speed transducer which measures the speed fluctuations at one shaft end.

Figure 5:
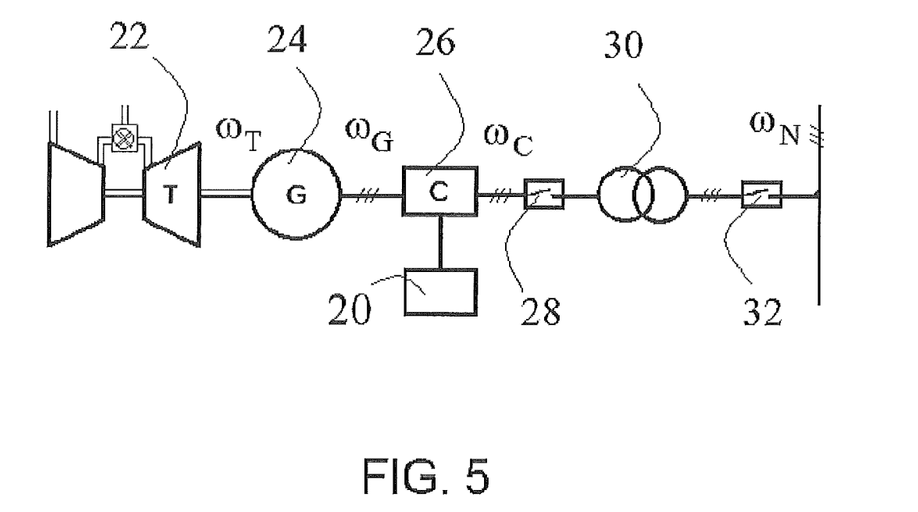
FIG. 5 shows a schematic block diagram of a gas turbine power plant with a frequency converter connected to an electrical grid as an example to apply the system.

FIG. 5 shows a schematic block diagram of a gas turbine power plant at which the system 3 according to the invention can be applied. At the left side of FIG. 5 a gas turbine 22 or a system of gas turbines is illustrated. To the gas turbine 22 commonly a generator 24 is connected, especially a turbo-generator, which is driven by the turbine 22. The generator 24 generates an electric voltage from the mechanical power provided by the turbine 22. The generator 24 comprises among others the rotor 1 which the system 3 is assigned to. The voltage generated by the generator 24 has a specific frequency depending on the design of the generator 24 and the rotational speed of the gas turbine 22, illustrated by the angular frequency $w_G$. To the end of adjusting the frequency to a frequency proper for an electrical grid, a frequency converter 26 is connected to the generator 24. The frequency converter 26 converts the frequency $\omega_G$ into the frequency $\omega_C$. The frequency converter 26 can be identical with the frequency converter 26 which is applied commonly in such a system, alternatively an additional or auxiliary frequency converter 26 can be provided. Here, the compensation means 20 as a component of the system 3 is connected to the common frequency converter 26. The compensation means 20 generates counter-torque excitation and/or frequency-selective damping to the rotor 1 by electrical or non-electrical means. In the case of electrical means the compensation means 20 comprises an electric machine or energy supply unit which produces or consumes electrical power at a different frequency than the electrical grid to which the electric machine is connected. In the case of non-electrical means the compensating means 20 comprises a mass damper adapted to compensate mechanical forces by mechanical counterforces. The electrical means is the electrical winding of the electrical machine in an example. Alternatively, to add the electrical signal to the given windings of the electric machine, additional windings can be furnished. The generated signal to compensate for mechanical forces is fed to the additional windings at the rotor 1 or at the rotor of an auxiliary machine. The generated signal is modulated to the voltage present in the winding to excite the rotor 1. As an alternative to modulate the generated signal of the computer unit 15 an auxiliary machine (not shown) can be provided. The auxiliary machine, for example an exciter, feeds the rotor 1 with the generated signal. The generated signal is transmitted via the common frequency converter 26 or via an auxiliary frequency converter. A generator breaker 28 is applied to the components of the power plant to disconnect the generator 24 from the electric grid in a controlled way. Further, a step-up transformer 30 to increase the generated voltage and a circuit breaker 32 to disconnect follow as components. The circuit breaker 32 connects the components to the electric grid as shown in FIG. 5 at the right side with an angular frequency of $\omega_N$. The system 3 as described can be integrated in the main control systems of the power plant. However, the system 3 can also be designed as an independent control system 3 of the power plant which is not integrated into the main control system, which is manufactured separately from this, and located separately in operation. The system 3 as described is combinable with common standard vibration monitoring systems according to the state of the art.

Figure 6:
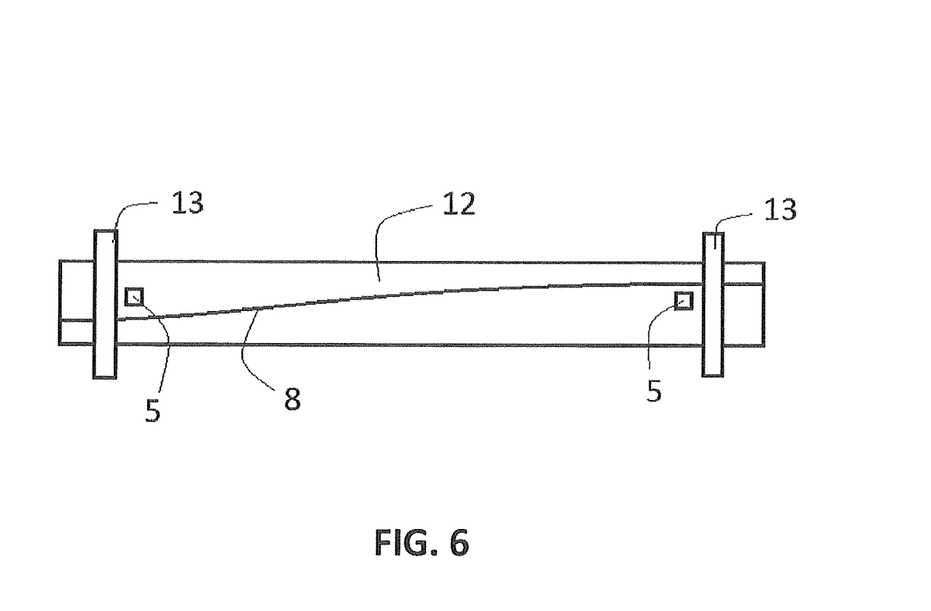
FIG. 6 shows a schematic side view of a rotor for a direct measurement of shaft torsion with two measurement areas and two telemetry rings.

FIG. 6 shows a schematic side view of a shaft 12 of a rotor 1 for a direct measurement of shaft torsion. Here, two measurement devices 5 are provided, one near the left end and the other near the right end of the shaft 12. The measurement devices 5 are strain gauges 7 attached to the shaft of the rotor 1. In an alternative solution the measurement devices 5 are contactless sensors directed to take torsional measurements from the shaft 12. The contactless sensors are in this example inductive sensors, which measure torques. The measurement concept is based on the anisotropic magneto-restrictive effect occurring in ferromagnetic surfaces like the shaft 12 of the rotor 1. The anisotropic magneto-restrictive effect causes a different magnetic permeability in the direction of the tensile stresses and the compression stresses depending on the mechanical torsion stresses. The contactless sensors measure the changes in permeability which are proportional to the torsional stresses at the shaft surface in a wide range. The measurement is done directly here, an absolute or relative angular measurement. The measurement data is collected by the two telemetry rings 13 each adjacent to the two measuring devices 5 according to FIG. 6. The two telemetry rings 13 transmit the measurement data to the analyser unit 10 as described under FIG. 4. In the analyser unit 10 the measured differences of the magnetic permeability between the left measuring device 5 and the right measuring device 5 are assigned to corresponding torsional stresses between the two points of measurement. In FIG. 6 a schematic torsional stress curve 8 is shown characterizing the different torsional stress areas along the shaft 12 of the rotor 1. The torsional stress curve 8 indicates a different torsional stress at the left side than at the right side of the shaft 12 of the rotor 1. The torsional stress mostly changes roughly at the middle of the shaft 12 of the rotor 1. The measurement data obtained in such ways are compared to stored data in the computer unit 15. The stored date comprises maximum values allowable for specific properties of the rotor 1, as the torsional stress. In case the current measurement exceeds a maximum value stored in the computer unit 15, interventions are started, protective and/or control actions. These interventions are the generation of electrical signals applied to the rotor 1 or the mechanical damping as described above.

Figure 7:
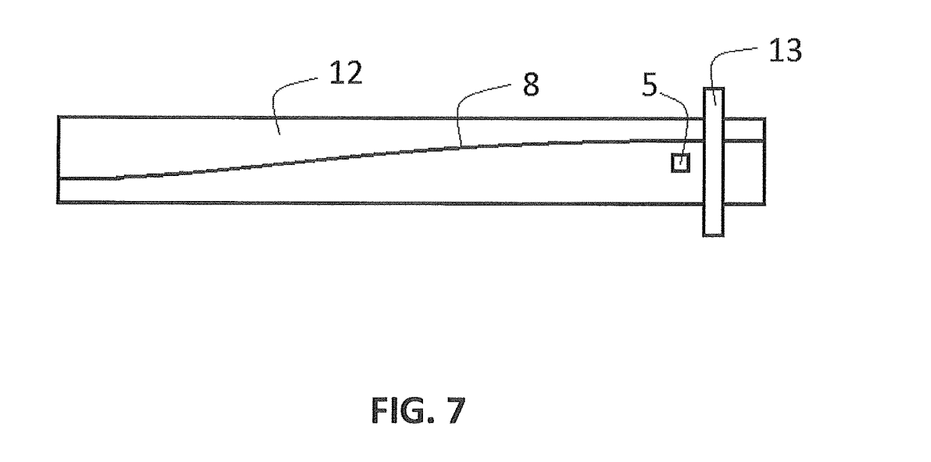
FIG. 7 shows a schematic side view of a rotor for an indirect measurement of shaft torsion with one measurement area and one telemetry ring.

FIG. 7 is a schematic side view of a shaft 12 similar to FIG. 6 showing an indirect measurement. Here, one measuring device 5 is provided near the right end of the shaft 12, with a telemetry ring 13 around the shaft 12 assigned to the measurement device 5. The determination of the torsional stresses is done here indirectly by measuring the rotation frequency or the angular acceleration.

Figure 8:
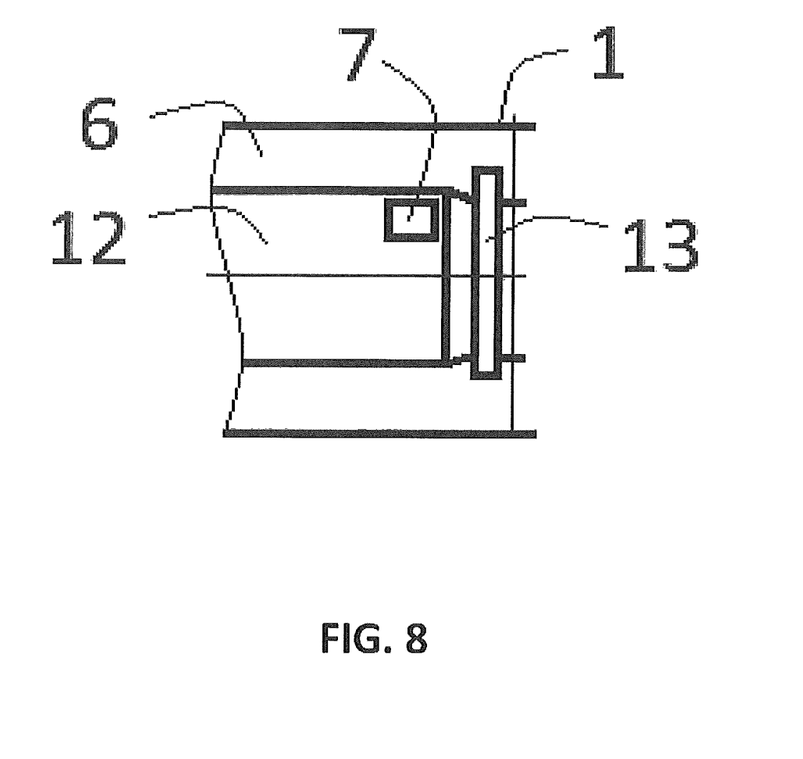
FIG. 8 shows a schematic side view of a rotor shaft with rotor housing with a strain gauge attached to the rotor and a telemetry ring connected around the rotor shaft to transmit the measurement data collected by the strain gauge to the analyzer unit.

FIG. 8 shows a schematic side view of a part of the rotor shaft 12 with a rotor housing 6. In this example the measuring device 5 comprises four strain gauges 7 attached to the shaft 12, illustrated by a rectangular. The strain gauges 7 comprise a digital signal processor integrated with each strain gauge 7 forming together an elongated ribbon which can flexibly be adjusted to the bended surface of the shaft 12. The strain gauges 7 are fixed to the shaft 12 by a tape of cloth from poly-paraphenylene terephthalamide, also known as Kevlar, covering the strain gauges 7 and connecting the strain gauges 7 securely to the shaft 12. The tape of cloth is also flexible as the strain gauges 7 with digital signal processor to adjust to the surface of the shaft 12. The digital signal processor can take over the function of the telemetry ring 13 to transmit the measurement data to the analyser unit 10. Alternatively, the digital signal processor transmits the measurement data from the connected strain gauge 7 to the telemetry ring 13.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

The invention claimed is:

1. A system for compensating torsions at a rotating rotor, the system comprising:
   at least one cavity projecting through a housing of the rotating rotor;
   at least one measuring device comprising at least a high resolution speed transducer arranged in the at least one cavity for measuring speed fluctuations at the rotating rotor to obtain measured data;
   an analyser unit for calculating torsional stresses or velocity of deformation of the rotating rotor using the measured data; and
   compensation means comprising a power supply unit for supplying an electrical power, adapted in amplitude and frequency to the measured data of the rotating rotor, to the rotating rotor to compensate torsions at the rotating rotor;
   wherein the power supply unit is a frequency converter.

2. The system according to claim 1, wherein the frequency converter is implemented between a generator comprising the rotating rotor and a power grid, to convert to a frequency appropriate for the power grid.

3. The system according to claim 1, wherein the frequency converter is an additional frequency converter.

4. The system according to claim 1, wherein the compensation means comprises a mass damper adapted to compensate mechanical forces by mechanical counterforces.

5. The system according to claim 1, wherein the at least one measuring device measures torsional stress, torsional deformation, and/or torsional vibrations of a shaft of the rotating rotor.

6. The system according to claim 1, wherein the at least one measuring device comprises at least a strain gauge attached to the rotating rotor, which strain gauge comprises a digital signal processor.

7. The system according to claim 6, wherein the strain gauge is fixed to the rotating rotor by a tape of cloth from poly-paraphenylene terephthalamide.

8. The system according to claim 1, wherein the at least one measuring device comprises a contactless sensor.

9. The system according to claim 1, wherein the system is integrated in a power plant main control system.

10. Use of the system according to claim 1, wherein the system is at the rotating rotor of an electric machine.

11. A method for compensating torsion at a rotating rotor comprising:
    arranging at least one measuring device in at least one cavity projecting through a housing of the rotating rotor;
    measuring with the at least one measuring device comprising at least a high resolution speed transducer, speed fluctuations at the rotating rotor to obtain measured data;
    calculating using the measured data torsional stresses or velocity of deformation of the rotating rotor with an analyser unit;
    generating with a compensation means comprising a power supply unit an electrical power, adapted in amplitude and frequency to the measured data of the rotating rotor; and
    supplying via a frequency converter the adapted electrical power to the rotating rotor to compensate the torsion.

* * * * *